C. KOVACS.
RESILIENT WHEEL.
APPLICATION FILED MAY 24, 1917.
1,267,876.
Patented May 28, 1918.
2 SHEETS—SHEET 2.
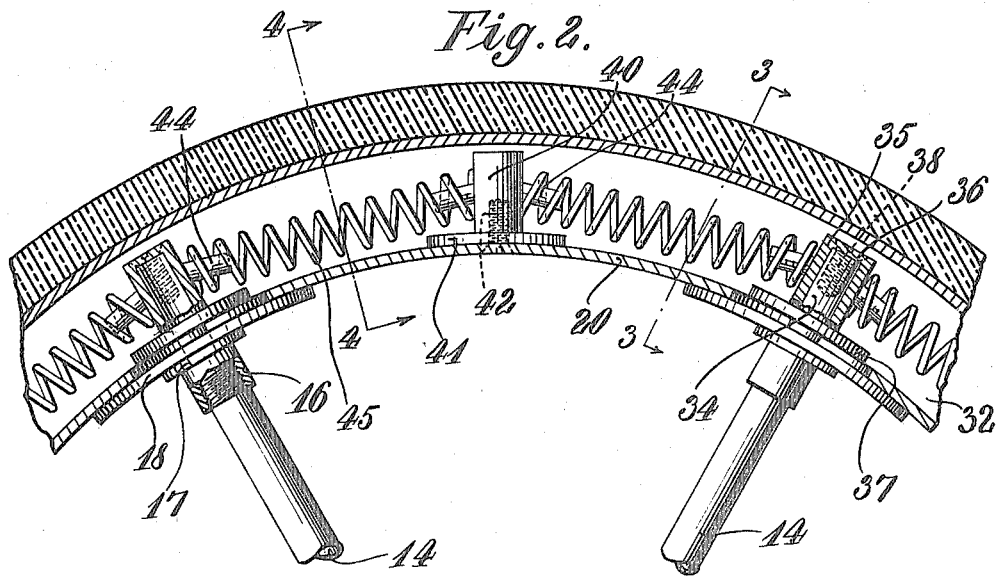
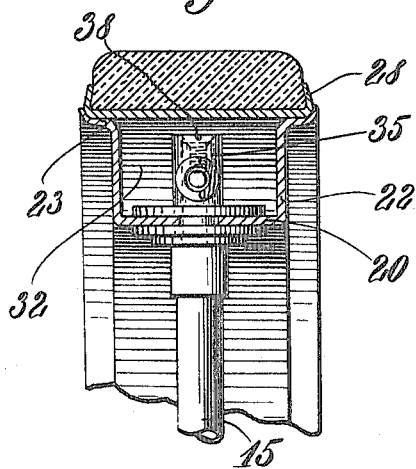
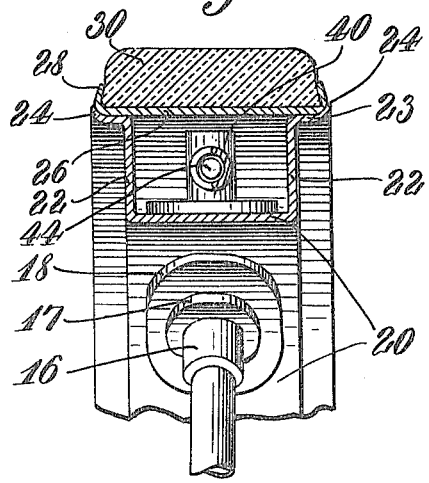
Inventor
Charles Kovacs
By his Attorney
Oscar Geier

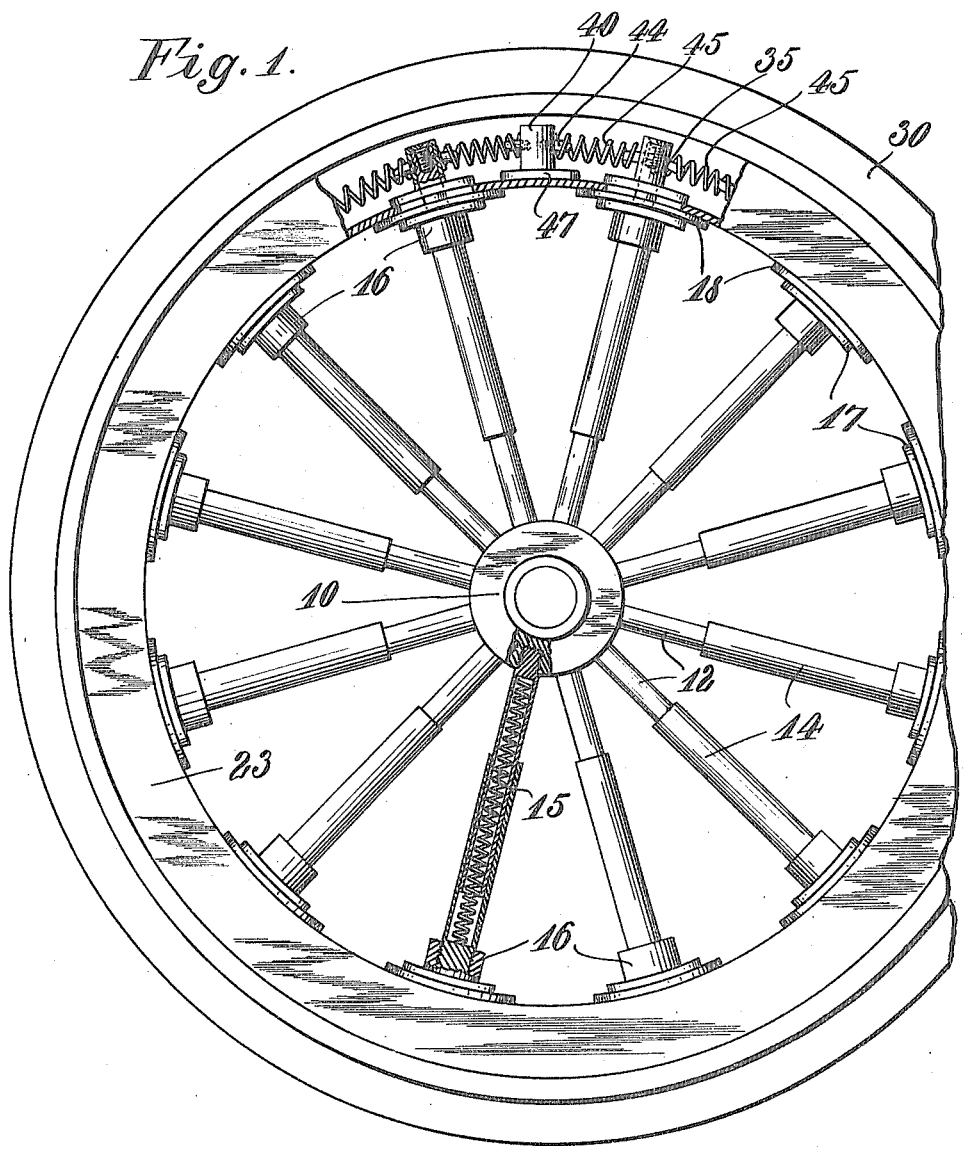

UNITED STATES PATENT OFFICE.

CHARLES KOVACS, OF PERTH AMBOY, NEW JERSEY, ASSIGNOR OF ONE-HALF TO JOHN KEREKES, OF GREENPOINT, NEW YORK.

RESILIENT WHEEL.

1,267,876.  Specification of Letters Patent.  Patented May 28, 1918.

Application filed May 24, 1917. Serial No. 170,781.

*To all whom it may concern:*

Be it known that I, CHARLES KOVACS, a citizen of the United States, resident of Perth Amboy, county of Middlesex, and State of New Jersey, have invented certain new and useful Improvements in Resilient Wheels, of which the following is a specification.

This invention relates to improvements in resilient wheels, and has as its special object the provision of a wheel which may be deflected under loads, the deflection being taken by a plurality of springs mounted in different parts thereof.

A further object is the provision of novel means whereby the tread is enabled to move relatively to the fixed rigid hub when the wheel is under stress, as by a load carried by the vehicle upon which the wheels are engaged.

A further object is to provide a wheel comprised of few and simple parts, which are readily assembled, and inexpensive to construct, the parts being so contained as to be substantially inaccessible to the dust and accumulations from the roadway.

These and other like objects are attained by the novel construction and combination of parts hereafter described and shown in the accompanying drawings, forming a material part of this specification, and in which:—

Figure 1 is a side elevational view of a wheel made in accordance with the invention, parts being broken away to show the inside construction.

Fig. 2 is an enlarged fragmental sectional view of the rim and tread thereof.

Fig. 3 is a transverse sectional view taken on line 3—3 of Fig. 2, and

Fig. 4 is a transverse sectional view taken on line 4—4 of Fig. 2.

The wheel comprises a rigid central hub 10, which may be of any preferred form of construction and in which are rigidly secured the inner ends of radial spokes 12, the same being engaged telescopically with tubes 14, and containing spirally wound compression springs 15, the ends of the springs pressing against abutments formed integrally with the extreme inner end of the spokes 12 and similarly formed abutments formed with the extremities of the telescopic tubular elements 14, which are screw-threaded and engaged with the sockets 16, formed with annular flanges 17 which abut against arcuately formed plates 18, disposed against the interior of the rigid annular rim 20, the latter being part of a hollow casing having lateral elements 22, terminating in outturned flanges 23, the extreme edges 24 of which are curved outwardly as indicated.

Resting in the seat formed by the curved edges 24 is an annular plate ring 26, having outwardly extending lateral flanges 28, by means of which is secured the tread 30, the same resting against the plate 26 so as to be supported thereby, the plate forming a cover for the chamber 32, formed between the side elements 22 and plate rim 20.

Uniformly spaced openings are provided through the plate 20 adapted to receive the stems 34, formed with the sockets 16, and secured upon the stem extensions 34 are cylindrical sleeve elements 35, having integrally formed caps or covers 36 at their outer ends, and terminating in arcuate flanges 37, at the inner ends, the same being adapted to abut against the outer surface of the plate rim 20 and held firmly thereagainst by means of the screws 38.

Similar sleeves 40 are positioned midway of the sleeves 35, the flanges 41 of which are secured by screws 42 passing inwardly through the plate rim 20, as can best be seen in Fig. 2.

Formed with the sleeves 35 and 40 are pairs of oppositely disposed pins 44, the same extending obliquely and being alined one with the other, their axes being substantially tangential to the plate rim 20.

Engaged between adjacent pins 44 are spirally wound compression springs 45, which exert pressure therebetween and tend to oppose any thrust brought to bear upon the tread by reason of weight transmitted to the hub 10, the several springs being contained within the compartment 32 which, as before noted, is entirely covered so as to prevent the entrance of dust and the like accumulations from the roadway.

Thus it will be seen that a novel and practical device has been presented which permits the tread and its seat to move relatively to the hub 10, when a shock or jar occurs and to be immediately brought into normal position when the obstruction has been passed over.

Having thus described my invention, what I claim as new, and desire to secure by Letters Patent, is:—

In a resilient wheel, the combination with a rigid hub, a plurality of spokes rigidly engaged therein, and a rigid hollow rim containing slots through which the outer ends of said spokes extend, of plate washers engaged upon the ends of said spokes, said washers making contact upon both sides of the inner element of said rim so as to cover the slots therethrough, sleeves engaged on the ends of said spokes within the space in said rim, projections secured within said rim intermediate of said sleeves, pins set obliquely in opposite sides of said sleeves, and said projections, the adjacent pins being in alinement, and compression springs extending between adjacent sleeves and projections, the ends of said springs encircling said pins and constituting resilient connecting means between said rim and said spokes.

In testimony whereof I have affixed my signature.

CHARLES KOVACS.